United States Patent [19]

Yoshioka

[11] 3,998,789

[45] Dec. 21, 1976

[54] FLAME RESISTANT THERMOSETTING RESIN COMPOSITION AND METHOD FOR PREPARING SAME

[75] Inventor: Akira Yoshioka, Yokohama, Japan

[73] Assignee: Sumitomo Bakelite Company, Limited, Tokyo, Japan

[22] Filed: Sept. 9, 1974

[21] Appl. No.: 504,175

[30] Foreign Application Priority Data

Sept. 11, 1973 Japan .............................. 48-101673
Sept. 11, 1973 Japan .............................. 48-101674
Jan. 14, 1974 Japan ................................ 49-6653
Feb. 20, 1974 Japan ............................... 49-19515
Feb. 20, 1974 Japan ............................... 49-19516

[52] U.S. Cl. ................ 260/47 P; 260/45.7 P; 260/45.9 NC; 260/45.95 D; 260/45.95 G; 260/47 EQ; 260/59 R; 260/67.6 R; 260/864; 260/865
[51] Int. Cl.² .................... C08K 5/52; C08K 5/53; C08G 79/04
[58] Field of Search .............. 260/930, 943, 45.7 P, 260/45.95 D, 45.95 G, 51.5, 47 EQ, 47 P, 59, 865, 864, 45.9 NC, 67.6, 953

[56] References Cited

UNITED STATES PATENTS

| | | | |
|---|---|---|---|
| 2,682,522 | 6/1954 | Coover et al. | 260/930 |
| 2,916,473 | 12/1959 | Bullock et al. | 260/2 P |
| 3,326,852 | 6/1967 | Thomas | 260/47 P |
| 3,385,801 | 5/1968 | Beriem et al. | 260/77.5 |
| 3,409,571 | 11/1968 | Shepard et al. | 260/59 |
| 3,423,369 | 1/1969 | Nachbur et al. | 260/67.6 |
| 3,658,952 | 4/1972 | Nachbur et al. | 260/45.9 |
| 3,742,095 | 6/1973 | Walsh | 260/45.9 |
| 3,761,543 | 9/1973 | Gunsher | 260/930 |
| 3,819,580 | 6/1974 | Daigle | 260/51.5 |
| 3,823,206 | 7/1974 | Golborn et al. | 260/45.9 |

Primary Examiner—V. P. Hoke
Attorney, Agent, or Firm—Karl W. Flocks

[57] ABSTRACT

A thermosetting resin may be imparted with favorable flame resistance, heat resistance, and curing characteristics by the incorporation of a heat resistant polyphosphoric acid ester or an organic phosphonate compound containing a hydroxymethyl or amide group. Such a resin is suitable particularly as a material for manufacturing those thermosetting molding compounds, laminates, electrical insulating materials such as insulating varnishes, and adhesives which are required to be flame resistant.

33 Claims, No Drawings

FLAME RESISTANT THERMOSETTING RESIN COMPOSITION AND METHOD FOR PREPARING SAME

This invention relates to a flame resistant thermosetting resin composition and to a method for preparing same. More particularly, this invention relates to a flame resistant thermosetting resin composition excellent in thermal stability.

It has already been known to use various phosphorus-containing or halogen-containing compounds in imparting flame resistance to thermosetting resins such as phenolic resins, epoxy resins, and polyester resins. For instance, as for the phosphorus-containing compounds, it has been known that tricresyl phosphate, cresyl diphenyl phosphate, and the like imparted flame retardancy. On the other hand, well-known examples of the halogen-containing compounds are chlorinated paraffins and hexabromocyclododecane. These known flame retardants, however, have a disadvantage of deteriorating physical properties of the resin, the deterioration being particularly marked in thermal resistance, curing characteristics, and mechanical characteristics. Another defect of the resin composition incorporated with such a flame retardant is generation of fumes and disagreeable odors during processing. It is also a disadvantage that the flame retardant is gradually lost with time from the resin composition in which it is incorporated, resulting in gradual decrease of the flame resistance with the lapse of time.

As a result of studies conducted to eliminate disadvantages of the conventional flame resistant thermosetting resins, the present inventor has found a novel flame resistant thermosetting resin containing a phosphorus compound which has no customary disadvantage.

An object of this invention is to provide a flame resistant thermosetting resin excellent in thermal stability, curing characteristics, and mechanical characteristics.

Another object of this invention is to provide a flame resistant thermosetting resin composition in which a flame retardant is mixed stably and uniformly and which generates neither fume nor disagreeable odor, shows no discoloration during processing, and is excellent in flame resistance that does not decrease with time.

A further object of this invention is to provide a method for producing the said flame resistant thermosetting resin composition.

Other objects and advantages of this invention will become apparent from the following description.

According to this invention, there is provided a flame resistant thermosetting resin composition obtained by preparing a thermosetting resin in the presence of at least one compound selected from the group consisting of phosphorus compounds represented by the general formula:

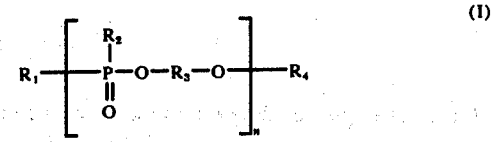

wherein $R_1$ and $R_2$, which may be the same or different, represent each an alkyl, aryl, alkoxy, or aryloxy group, which has up to 10 carbon atoms and may have one or more halogen or hydroxyl substituents; $R_3$ represents an aromatic ring; $R_4$ represents a hydrogen atom, an alkyl group or an aryl group, both groups having up to 10 carbon atoms, and $n$ is an integer from 2 to 30, phosphorus compounds represented by the general formula:

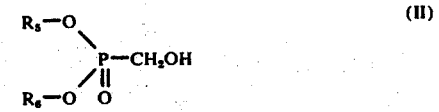

wherein $R_5$ and $R_6$, which may be the same or different, represent each an alkyl, alkenyl, or aryl group, which has up to 20 carbon atoms and may have one or more halogen substituents, and phosphorus compounds represented by the general formula:

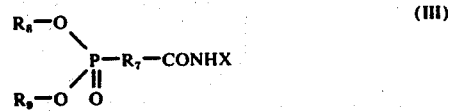

wherein $R_8$ and $R_9$, which may be the same or different, represent each an alkyl, alkenyl or aryl group, which has up to 20 carbon atoms and may have one or more halogen substituents, $R_7$ represents an alkylene, alkenylene or arylene group, which has up to 10 carbon atoms and may have one or more halogen substituents, and X represents hydrogen atom or hydroxymethyl group; and also a method for preparing such a flame resistant thermosetting resin composition.

The compounds represented by the general formula (I) and use in this invention are polyphosphoric acid esters for which, for example, those compounds obtained by the following reactions are suitable:

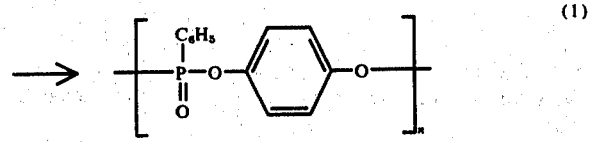

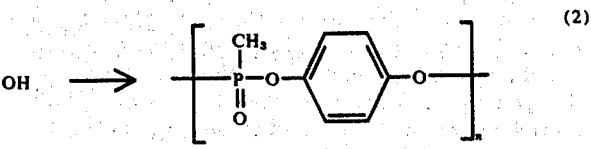

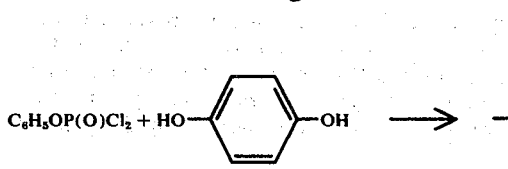
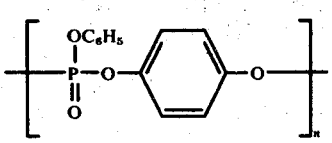

(n = 2 to 8)

Other examples of the compounds are as follows:

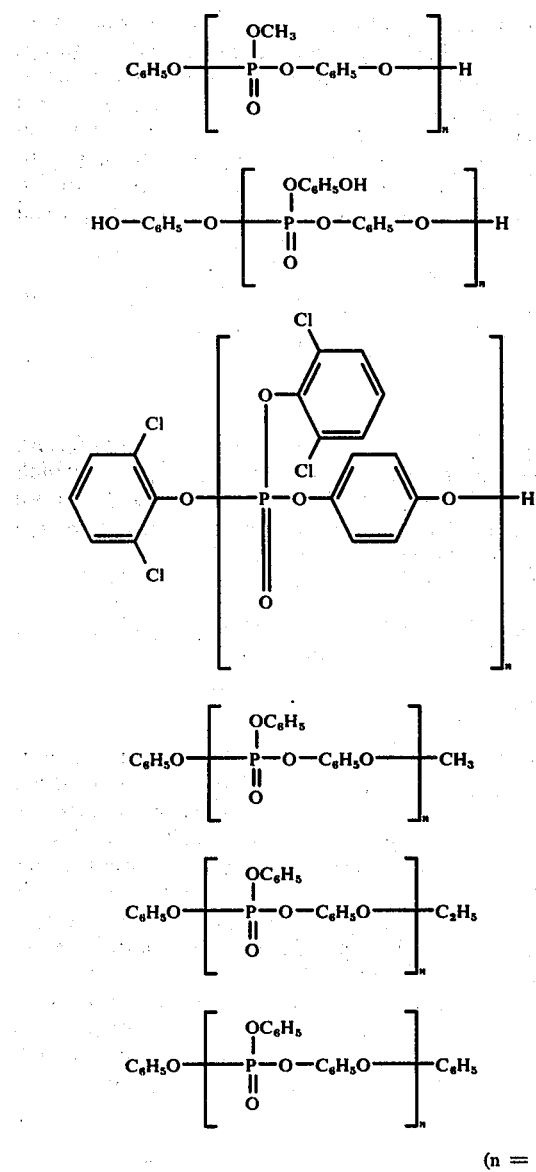

(n = 2 to 8)

In the general formula (I), if n exceeds 30, dispersion of the compound in the thermosetting resin becomes inferior.

The compounds represented by the general formula (II) and used in this invention are phosphonate compounds having hydroxymethyl group such as, for example, diethyl hydroxymethyl phosphonate, diphenyl hydroxymethyl phosphonate, diallyloxy hydroxymethyl phosphonate, and di(2,3-dichloropropoxy)-hydroxymethyl phosphonate. These hydroxymethyl phosphonates may be synthesized, for example, by the following reaction:

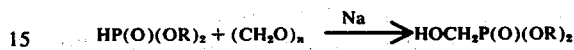

The compounds represented by the general formula (III), which are used in this invention, are phosphonate compounds having an amide group. Examples of the particularly preferable compounds are

The compound of the formula (4) is obtained, for example, by reacting a corresponding phosphite and acrylamide in the presence of ethanolic sodium ethoxide.

Among the thermosetting resins for use in this invention, particularly preferred are phenolic resins, amino resins, epoxy resins, polyester resins, and these resins modified with one another.

The phenolic resins include phenol-formaldehyde resins and these resins modified with various modifiers such as drying oils, rubbers, and aromatic hydrocarbons. As the phenolic component, can be used all phenols capable of reacting with formaldehyde, that is, phenols suitable for manufacturing well-known phenol-formaldehyde resins, including, for example, phenol itself; substituted monophenols such as cresol and xylenol; polyphenols such as resorcinol and bisphenols; and suitable mixtures of various phenols. Formaldehyde is used generally in the form of aqueous solution, though in some cases paraformaldehyde can be used.

The amino resins suitable or use as those resins made from urea, thiourea, melamine, benzoguanamine, acetoguanamine, formguanamine, or dicyandiamide and formaldehyde.

The epoxy resins for use include the compounds obtained by reacting a polyphenol, polynuclear polyphenol, or aliphatic polyhydric alcohol with an epihalohydrin or dihalohydrin in an alkaline medium as catalyst in conventional way, and also the known compounds obtained by epoxidizing a cycloaliphatic or aliphatic compound containing a diene linkage by oxidation with a peracid. Particularly suited is, for example, an epoxy resin of the following molecular structure:

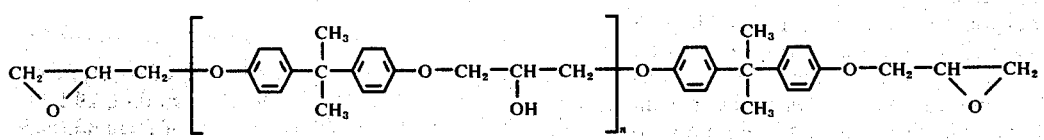

The curing agents suitable for use with these epoxy resins are aliphatic or aromatic polyamines, acid anhydrides, polyamides, BF$_3$-amine complexes, and dicyandiamide, though not limited to these compounds.

The term "polyester resin", as herein referred to, means a resin obtained by dissolving in a suitable amount of a vinyl monomer a polyester prepared from an unsaturated acid such as maleic anhydride or fumaric acid and a glycol.

The method for preparing a flame resistant thermosetting resin in the presence of the aforesaid phosphorus compound will be explained below.

The first method consists in mixing the aforesaid phosphorus compound with a thermosetting resin in the presence or absence of an acid or alkaline catalyst. A desired flame resistant resin may be obtained by mixing at least one of the compounds represented by formulas (I), (II) and (III) with a thermosetting resin at room temperature or with heating. In the case of mixing with heating, at least one of the phosphorus compounds represented by formulas (I), (II) and (III) may be previously reacted with an epoxy compound having at least one epoxy group in the molecule. The epoxy compound having at least one epoxy group in the molecule includes, for example, bis(p-hydroxyphenyl)methane, 2,2-bis(p-hydroxyphenyl)propane, 2,2-bis(4'-hydroxy-3',5'-dibromophenyl)-propane, 1,1,2,2-tetrabis(p-hydroxyphenyl)ethane, glycidyl ethers of phenol novolac and cresol novolac, polyglycidyl ethers of phenol novolac and cresol novolac, dicyclopentadiene diepoxide, phenyl glycidyl ether, and the like.

The second method consists in preparing a thermosetting resin in the presence of the aforesaid phosphorus compound. This method is particularly effective with a formaldehyde-based thermosetting resin such as phenolic resin or amino resin. The ratio of the phosphorus compound to the thermosetting resin can be determined in accordance with the required degree of flame resistance; preferable ratios are generally in the range of 0.7 to 6% by weight in terms of phosphorus atom content of the total resin.

In order to explain the method for preparing a flame resistant phenolic resin in further detail, the case of preparing a resol-type resin will be explained below as an example.

In the first method, the main reactants including a phosphorus compound, a phenol, and formaldehyde are mixed, then, if necessary, admixed with a drying oil and various additives, and the resulting mixture is heated in the presence of an alkali to allow the reactants to condense.

In the second method, at first an ordinary resol-type phenolic resin or a modified resol-type phenolic resin is prepared and then resulting resin is mixed with a phosphorus compound. In this method, after having been mixed, the mixture can be heated to further advance the condensation.

The third method comprises first preparing an ordinary resol-type phenolic resin or a modified resol-type phenolic resin and then mixing with a phosphorus compound which has previously been reacted with formaldehyde.

The fourth method comprises reacting a phosphorus compound with formaldehyde, admixing the reaction product with a phenol, formaldehyde, and, if necessary, a drying oil and various additives, heating the resulting mixture in the presence of an alkali to condense the reactants.

Beside these four methods, there are possibly various modifications of these methods such as modification in the reaction sequence or in the way of mixing the reactants. All of such modifications will be able to produce the intended flame resistant resins. In short, the object of this invention will be achieved by incorporating the phosphorus compound in the thermosetting resin in any reaction step before the latter has been cured, thus making the resulting resin composition markedly less volatile. It seems highly probable that as the result of marked reduction in volatility of the flame retardant, the flame resistant resin compound obtained as mentioned above is greatly improved in flame resistance and thermal stability and also maintains a high level of curing characteristics and electrical characteristics.

Although excellent in flame resistance, the prsent resin composition can be further admixed with known flame retardants such as, for example, halogenated polyphenols, halogenated epoxy compounds, antimony compounds, nitrogen compounds, and organic phosphate esters.

The flame resistant resin composition of this invention is particularly suitable or use in manufacturing laminates, molding compounds, and electrical insulating materials such as insulating varnishes. It is also useful as an adhesive.

The invention is illustrated below in detail with reference to Examples, but the invention is not limited thereto.

EXAMPLE 1

A mixture comprising 250 g of a polyphosphate ester of formula (3) (n is substantially equal to 3), 564 g of phenol, 585 g of an aqueous formaldehyde solution (37%), and 11.3 g of an aqueous ammonia (28%) was refluxed for 2 hours to allow the reaction to proceed. The reaction mixture was dehydrated under reduced pressure and diluted with 500 g of acetone to obtain a homogeneous clear resin solution.

EXAMPLE 2

A mixture comprising 150 g of phenol, 145 g of an aqueous formaldehyde solution (37%), and 3 g of aqueous ammonia (28%) was allowed to react with refluxing for 1.5 hours. The reaction mixture was dehydrated, admixed with 66 g of diethyl hydroxymethyl phosphonate, heated at 120° C for 1 hour, and diluted with acetone to obtain a homogeneous clear resin solution.

EXAMPLE 3

A liquid mixture comprising 140 g of 3-(diphenylphosphono)propionamide, 392 g of phenol, 456 g of an aqueous formaldehyde solution (37%), and 10 g of aqueous ammonia (28%) was subjected to reaction under reflux for 2 hours. The reaction mixture was dehydrated under reduced pressure, and diluted with an acetone-methanol mixed solvent to obtain a homogeneous clear resin solution.

EXAMPLE 4

A mixture of 780 g of phenol, 200 g of N-hydroxymethyl-3-(diphenylphosphono)propionamide, 589 g of an aqueous formaldehyde solution (37%), and 2.5 ml of 10%-hydrochloric acid was heated with stirring until reflux begins and heating was continued, from then on, for 2.5 hours under reflux to allow the reaction to proceed. Thereafter the reaction mixture was dehydrated with heating under reduced pressure until the temperature of the mixture reached 150° C, then withdrawn from the reaction vessel, and cooled to obtain a novolac-type phenolic resin. To 1,000 g of the resin, were added 970 g of wood flour, 145 g of hexamethylenetetramine, 44 g of magnesia, and 22 g of magnesium stearate. The mixture was milled with heating and ground to obtain a molding material.

EXAMPLE 5

A mixture of 585 g of benzoguanamine and 750 g of an aqueous solution of formaldehyde (37%) was adjusted to pH 9.5, heated at 95° C for 2 hours, and then dehydrated under reduced pressure. To the resulting mixture was added 100 g of dibutyl hydroxymethyl phosphonate and allowed to react at 130° C for 1 hour, then diluted with acetone to obtain a homogeneous clear resin solution.

EXAMPLE 6

To 600 g of a bisphenol-A-based epoxy resin (epoxy equivalent: 500, and number average molecular weight: 1,000), were added 53 g of 4,4'-diaminodiphenylmethane, 90 g of diphenyl hydroxymethyl phosphonate, 3.3 g of zinc stearate as a release agent, 30 g of powdered silica and 150 g of powdered clay as fillers, and 3 g of carbon black as a pigment. The mixture was milled by means of a roll mill at 70° C for 10 minutes and ground to obtain a molding material.

EXAMPLE 7

To 350 g of an unsaturated polyester resin obtained by reacting butanediol-1,4, maleic anhydride, and fumaric acid, were added 150 g of diallyl phthalate, 125 g of a polyphosphate ester of the formula (1) ($n$ is substantially equal to 5), and 2 g of benzoyl peroxide. The mixture together with 50 g of asbestos, 150 g of kaoline, and 7 g of zinc stearate was mixed in a mixer to obtain a molding compound.

EXAMPLE 8

A liquid mixture comprising 100 g of 3-(diphenylphosphono)propionamide, 55 g of melamine, 292 g of phenol, 496 g of an aqueous solution of formaldehyde (37%), and 18 g of aqueous ammonia (28%) was allowed to react under reflux for 2 hours, then dehydrated under reduced pressure, and diluted with a methanol-toluene solvent mixture to obtain a homogeneous clear resin solution.

Comparative Example 1

A homogeneous clear resin was obtained in the same manner as in Example 1, except that tricresyl phosphate was used in place of the polyphosphate ester of the formula (3) ($n$ is substantially equal to 3).

EXAMPLE 9

A sheet of craft paper, 0.25 mm in thickness, was impregnated with a resin solution obtained in Example 1, 2, 3, 5 or 8 or in Comparative Example 1, and dried, to convert the resin into B-stage. The weight ratio of the resin adhered to the paper to the base material was 0.9 : 1. Nine sheets of such impregnated paper were placed one on another, and a copper foil was placed on one side of the resulting assembly, and the resulting assembly was heated for 40 minutes, while being subjected to a pressure, and then cooled. The characteristics of the laminated thus obtained were as shown in Table 1.

Table 1

| Example No. | Flame resistance (Burner test after UL 94) $\bar{x}$ | Thermal stability (Immersion in solder bath at 260° C) | Flexural strength (Transverse) (kg/mm$^2$) | Dielectric loss tangent C-90/20/65 (1 MHz) ($\times 10^{-4}$) | Resistance to trichloroethylene (boiled for 5 min.) |
|---|---|---|---|---|---|
| 1 | 2.1 sec. | 45 sec. OK | 14.4 | 345 | No change |
| 2 | 2.3 sec. | 45 sec. OK | 14.8 | 358 | No change |
| 3 | 2.6 sec. | 45 sec. OK | 14.5 | 343 | No change |
| 5 | 1.1 sec. | 45 sec. OK | 14.4 | 302 | No change |
| 8 | 1.3 sec. | 45 sec. OK | 14.5 | 337 | No change |
| Comparative Example 1 | 9.8 sec. | 20 sec. out | 8.2 | 413 | Blistered |

As is apparent from the Table, it is possible to obtain laminates having favorable flame resistance with retention of characteristics of each resin.

EXAMPLE 10

The molding materials obtained in Examples 4, 6 and 7 were heated at 140° C under applied pressure of 100 kg/cm$^2$ to obtain molded test specimens. On testing according to the UL method for testing flammability, all of the test specimens were found to be classed as 94 V–O with very slight generation of disagreeable odor and fume.

EXAMPLE 11

A liquid mixture of 140 parts by weight of 3-)diphenylphosphono)propionamide, 392 parts by weight of phenol, 456 parts by weight of 37% aqueous formaldehyde solution and 10 parts by weight of aqueous ammonia (28%) was subjected to reaction under reflux for 2 hrs. The reaction product was subjected to dehydration under reduced pressure and then diluted with 200 parts by weight of toluene. A sheet of craft paper having a thickness of 0.25 mm was impregnated with the thus diluted product and then dried to the B-stage. The weight ratio of the resin adhered to the paper to the base material was 0.9 : 1. Nine sheets of the thus impregnated paper were placed one on another, and a copper foil was placed on one side of the resulting assembly. The resulting assembly was heated and compressed for 40 min. under conventional conditions, and then cooled. The thus obtained laminate had the characteristics shown in Table 2.

EXAMPLE 12

A liquid mixture of 1,000 parts by weight of phenol, 1,100 parts by weight of 37% aqueous formaldehyde solution and 20 parts by weight of aqueous ammonia (28%) was subjected to reaction under reflux for 2 hrs, and then to dehydration under reduced pressure. The product was diluted with methanol, and then mixed with 350 parts by weight of N-hydroxymethyl-3-(diethylphosphono)propionamide. A sheet of craft paper was impregnated with the resulting mixture, and then subjected to the same manner as in Example 11 to obtain a laminate. This laminate had the characteristics shown in Table 2.

EXAMPLE 13

A liquid mixture of 1,000 parts by weight of cresol, 1,260 parts by weight of 37% aqueous formaldehyde solution and 20 parts by weight of aqueous ammonia (28%) was subjected to reaction under reflux for 1.5 hrs. Separately, a mixture of 350 parts by weight of 3-(diethylphosphono)propionamide, 150 parts by weight of formaldehyde and 1.2 parts by weight of Ca(OH)$_2$ was heated at 80° C for 2 hrs, and then mixed with the above varnish. The resulting mixture was subjected to dehydration under pressure, and diluted with 500 parts by weight of methanol and 500 parts by weight of toluene. A sheet of craft paper was impregnated with the thus diluted product and then subjected to the same procedure as in Example 11 to obtain a laminate. The characteristics of the laminate were as shown in Table 2.

Comparative Example 2

A liquid mixture of 1,000 parts by weight of cresol, 1,260 parts by weight of 37% aqueous formaldehyde solution and 20 parts by weight of aqueous ammonia (28%) was subjected to reaction under reflux for 1.5 hrs., then to dehydration under reduced pressure, and thereafter diluted with methanol. To the thus obtained resin solution was added 500 parts by weight of tricresylphosphate. A sheet of craft paper was impregnated with the thus obtained mixture, and then subjected to the same procedure as in Example 11 to obtain a laminate, which had the characteristics shown in Table 2.

Table 2

| Example No. | | 11 | 12 | 13 | Comp. Ex. 2 |
|---|---|---|---|---|---|
| Insulation Resistance ($\Omega$) | C-90/20/65 | $2 \times 10^{11}$ | $3 \times 10^{11}$ | $3 \times 10^{11}$ | $5 \times 10^{10}$ |
| | D-2/100 | $5 \times 10^8$ | $5 \times 10^8$ | $3 \times 10^8$ | $5 \times 10^6$ |
| Dielectric loss tangent (1 MHz) ($\times 10^{-4}$) | C-90/20/65 | 355 | 368 | 353 | 408 |
| | D-48/50 | 580 | 577 | 594 | 1340 |
| Solder heat resistance (260° C) (sec.) | | >30 | >30 | >30 | 15 |
| Flexural strength (transverse)(kg/mm²) | | 14.4 | 14.8 | 14.5 | 8.1 |
| Solvent resistance (Boiled in trichloroethylene for 5 min.) | | No change | No change | No change | Blistered |
| Flame resistance (JIS method) | | Passed | Passed | Passed | Passed |

Note: Measurement was according to JIS-6481.

As is clear from Table 2, with mere addition type flame retardant (Comparative Example 2), the characteristics of laminate are insufficient.

EXAMPLE 14

A liqud mixture of 1,000 g of phenol, 1,100 g of 37% aqueous formaldehyde solution and 20 g of aqueous ammonia (28%) was subjected to reaction under reflux for 2 hrs. Separately, a mixture of 300 g of benzoguanamine and 383 g of formaldehyde adjusted to a pH of 9.5 was heated at 95° C for 2 hrs., and then mixed with the above reaction product. The resulting mixture was subjected to dehydration under pressure, and then diluted with acetone. To the mixture was added 343 g of N-hydroxymethyl-3-(diethylphosphono)propionamide. A sheet of craft paper having a thickness of 0.25 mm was impregnated with the resulting mixture and then dried to the B-stage. The weight ratio of the resin adhered to the paper to the base material was 0.9 : 1. Nine sheets of the thus impregnated paper were placed on one another, and a copper foil was placed on one side of the resulting assembly. The resulting assembly was heated and compressed for 40 min. under conventional conditions, and then cooled. The characteristics of the thus obtained laminate were as shown in Table 3.

EXAMPLE 15

A liquid mixture of 1,000 g of cresol, 250 g of acetoguanamine, 1,280 g of 37% aqueous formaldehyde solution and 20 g of aqueous ammonia (28%) was subjected to reaction under reflux for 1.5 hrs., and then to dehydration under reduced pressure, and thereafter diluted with acetone. To the thus obtained resin solution was added 343 g of N-hydroxymethyl-3-(diethylphosphono)-propionamide. a laminate was prepared in the same manner as in Example 14 using the resulting mixture. The characteristics of the laminate were as shown in Table 3.

EXAMPLE 16

A mixture of 140 g of 3-(diphenylphsophono)-propionamide, 120 g of acetoguanamine and 176 g of 37% aqueous formaldehyde solution, adjusted to a pH of 9.5, was subjected to reaction at 95° C for 2 hrs., and then to dehydration under reduced pressure. The reaction product was diluted with acetone and then mixed with 600 g of a conventional resol type phenol resin varnish. Using the resulting mixture, a laminate was prepared in the same manner as in Example 14. The characteristics of the laminate were as shown in Table 3.

EXAMPLE 17

A liquid mixture of 100 g of 3-(diphenylphosphono)-propionamide, 40 g of 37% aqueous formaldehyde solution and 2.5 g of aqueous ammonia (28%) was subjected to reaction under reflux for 2 hrs., then to dehydration under reduced pressure, and thereafter diluted with acetone. Separately, a liquid mixture of 120 g of benzoguanamine and 120 g of formaldehyde, adjusted to a pH of 9.5, was subjected to reaction at 80° C for 4 hrs., then to dehydration under reduced pressure, and thereafter diluted with acetone. The above two resin solutions were mixed, and 600 g of a conventional resol type phenol resin varnish was mixed with the resulting mixture. Using this mixture, a laminate was prepared in the same manner as in Example 14. The characteristics of the laminate were as shown in Table 3.

Comparative Example 3

A liquid mixture of 1,000 g of cresol, 1,260 g of 37% aqueous formaldehyde solution and 20 g of aqueous ammonia (28%) was subjected to reaction under reflux for 1.5 hrs., then to dehydration under reduced pressure, and thereafter diluted with methanol. To the thus obtained resin solution was added 500 g of tricresyl phosphate. Using the resulting mixture, a laminate was prepared in the same manner as in Example 14. The characteristics of the laminate were as shown in Table 3.

ous solution) was subjected to reaction under reflux for 1.5 hrs., then to dehydration, and thereafter mixed with 200 g of a polyphosphoric acid ester having formula (2) ($n$ is substantially equal to 3) and 400 g of acetone. Using the resulting mixture, a laminate was prepared in the same manner as in Example 14. The characteristics of the laminate were as shown in Table 4.

EXAMPLE 19

A liquid mixture of 240 g of a polyphosphoric acid ester having formula (3) in which $n$ is substantially equal to 4, 150 g of 37% aqueous formaldehyde solution and 15 g of ammonia (28% aqueous solution) was subjected to reaction at a temperature of 96°–100° C for 1.5 hrs. Separately, a liquid mixture of 540 g of cresol, 486 g of formaldehyde and 11 g of ammonia was subjected to reaction under reflux for 1.5 hrs., and the reaction product was mixed with the above varnish. The resulting mixture was subjected to dehydration under reduced pressure and then diluted with 500 g of acetone. A sheet of craft paper was impregnated with the thus diluted product, and a laminate was prepared from the thus impregnated paper in the same manner as in Example 14. The characteristics of the laminate were as shown in Table 4.

Comparative Example 4

A liquid mixture of 1,000 g of cresol, 1,260 g of 37% aqueous formaldehyde solution and 20 g of aqueous ammonia (28%) was subjected to reaction under reflux for 1.5 hrs., then to dehydration under reduced pressure, and thereafter diluted with methanol. To the resulting resin solution was added 480 g of tricresyl phosphate. A sheet of craft paper was impregnated with the resulting mixture, and a laminate was prepared from the thus impregnated paper in the same manner as in Example 14. The characteristics of the laminate were as shown in Table 4.

Table 3

| Example No. | | 14 | 15 | 16 | 17 | Comp. Ex. 3 |
|---|---|---|---|---|---|---|
| Insulation resistance ($\Omega$) | C-90/20/65 | $3\times10^{11}$ | $5\times10^{11}$ | $3\times10^{11}$ | $1\times10^{11}$ | $5\times10^{10}$ |
| | D-2/100 | $5\times10^{8}$ | $3\times10^{8}$ | $1\times10^{8}$ | $2\times10^{8}$ | $3\times10^{6}$ |
| Dielectric loss tangent (1 MHz) ($\times 10^{-4}$) | C-90/20/65 | 358 | 361 | 355 | 340 | 413 |
| | D-48/50 | 557 | 579 | 572 | 577 | 1390 |
| Solder heat resistance (260° C) (sec.) | | 20–30 | 20–30 | 20–30 | 20–30 | 7 |
| Flexural strength (transverse) (kg/mm$^2$) A | | 14.8 | 14.4 | 14.5 | 14.8 | 8.2 |
| Trichloroethylene resistance (boiled for 5 min.) | | No change | No change | No change | No change | Blistered |
| Flame resistance (UL flame test maximum value) (sec.) | | 7 | 11 | 12 | 10 | 28 |

Note:
A: be received
C-90/20/65: Treatment at 20° C and a RH of 65% for 90 hrs.
D-48/50: Immersion in water at 50° C for 48 hrs.
D-2/100: Immersion in water at 100° C for 2 hrs.

As is clear from Table 3, laminates having good flame resistance are obtained while maintaining the characteristics of phenol resin.

EXAMPLE 18

A mixture of 450 g of phenol, 435 g of 37% aqueous formaldehyde solution and 3 g of ammonia (28% aque- Example 14. The characteristics of the laminate were as shown in Table 4.

Table 4

| Example No. | | 18 | 19 | Comp. Ex. 4 |
|---|---|---|---|---|
| Insulation | C-90/20/65 | $9\times10^{11}$ | $8\times10^{11}$ | $1.5\times10^{11}$ |

Table 4-continued

| Example No. | | 18 | 19 | Comp. Ex. 4 |
|---|---|---|---|---|
| resistance ($\Omega$) | D-2/100 | $8\times10^8$ | $8\times10^8$ | $2\times10^8$ |
| Dielectric loss tangent (1 MHz) ($\times 10^{-4}$) | C-90/20/65 | 344 | 351 | 385 |
| | D-48/50 | 538 | 554 | 921 |
| Solder heat resistance (260° C) (sec.) | | >30 Little fume | >30 Little fume | 15 Much fume |
| Flexural strength (transverse)(kg/mm$^2$) A | | 12.9 | 13.4 | 8.4 |
| Trichloroethylene resistance (boiled for 5 min.) | | No change | No change | De-laminated |
| Flame resistance (JIS method) | Time (sec.) | 3 | 3 | 7 |
| | Distance (mm) | 10 | 13 | 15 |

Note:
A: be received
C-90/20/65: Treated at 20° C, 65% RH for 90 hrs.
D-48/50: Immersion in water at 50° C for 48 hrs.
D-2/100: Immersion in water at 100° C for 2 hrs.

As is clear from Table 4, laminates having good flame resistance are obtained while maintaining the characteristics of phenol resin.

EXAMPLE 20

A uniform mixture of 77 g of diethylhydroxymethyl phosphonate, 45 g of a bisphenol-A-based epoxy resin which has a number average molecular weight of 380 and an epoxy euivalent of 190, and 0.5 g of sulfuric acid was subjected to reaction at 90° C for 1.5 hrs. The reaction product was neutralized with dimethylamine and then blended with 170 g (as solids) of a resol type phenol resin obtained under conventional reaction conditions. The resulting mixture was diluted with acetone to obtain a phenolic resin solution.

A sheet of linter paper having a thickness of 10 mils was impregnated with the above resin solution, and the resin was converted to the B-stage. Nine sheets of the thus impregnated paper were placed one on another, and a copper foil was placed on one side of the resulting assembly. The thus obtained assembly was heated and compressed under conventional conditions for 60 min, and then cooled. The thus obtained laminate had the characteristics shown in Table 5.

EXAMPLE 21

A uniform mixture of 99 g of diphenylhydroxymethyl phosphonate, 105 g of a brominated bisphenol-A-based epoxy resin which has a number average molecular weight of 1,000 and an epoxy equivalent of 500, and 2 g of triethylamine was subjected to reaction in toluene for 2.0 hrs. The reaction product was blended with a resin solution consisting of 190 g of a bisphenol-A-based epoxy resin which has a number average molecular weight of 1,000 and an epoxy equivalent of 500, 7.6 g of dicyandiamide, 0.4 g of benzylmethylamine and 100 g of acetone. A sheet of linter paper having a thickness of 10 mils was impregnated with the resulting mixture, and a laminate was prepared from the thus impregnated paper in the same manner as in Example 20. The characteristics of the laminate were as shown in Table 5.

Comparative Example 5

A mixture of 150 g of cresol, 127 g of formaline (37% aqueous solution) and 2.6 g of ammonia (28% aqueous solution) was subjected to reaction under reflux for 1.5 hrs., then to dehydration, and thereafter diluted with acetone. To the resulting resin solution was added 99 g of tricresyl phosphate, and a sheet of linter paper was impregnated with the resulting mixture. A laminate was prepared from the thus impregnated paper in the same manner as in Example 20. The characteristics of the laminate were as shown in Table 5.

Table 5

| Example No. | | 20 | 21 | Comp. Ex. 5 |
|---|---|---|---|---|
| Flame resistance (JIS method) | Time (sec.) | 3 | 4 | 7 |
| | Distance (mm) | 11 | 10 | 14 |
| Trichloroethylene resistance (Boiled for 5 min.) | | No change | No change | Surface-whitened, and swollen |
| Solder heat resistance (260° C) (sec.) | | >60 | >120 | 12 |
| Flexural strength (transverse) (kg/mm$^2$) A | | 12.4 | 13.8 | 8.4 |
| Insulation resistance ($\Omega$) | C-90/20/65 | $9\times10^{11}$ | $5\times10^{12}$ | $1.5\times10^{11}$ |
| | D-2/100 | $4\times10^8$ | $3\times10^{10}$ | $2\times10^7$ |
| Dielectric loss tangent (1 MHz) ($\times 10^{-4}$) | C-90/20/65 | 354 | 338 | 385 |
| | D-48/50 | 538 | 450 | 921 |

Note:
A: be received
C-90/20/65: Treatment at 20° C, 65% RH for 90 hrs.
D-48/50: Immersion in water at 50° C for 48 hrs.
D-2/100: Immersion in water at 100° C for 2 hrs.

As is clear from Table 5, laminates having good flame resistance are obtained while maintaining the characteristics of phenol resin.

EXAMPLE 22

A mixture of 150 g of phenol, 145 g of formaline (37% aqueous solution), 3 g of ammonia (28% aqueous solution) and 99 g of diphenyl hydroxymethyl phosphonate was subjected to reaction under reflux for 2.5 hrs., then to dehydration and thereafter diluted with acetone. A sheet of linter paper having a thickness of 10 mils was impregnated with the resulting resin solution, and a laminate was prepared from the thus impregnated paper in the same manner as in Example 20. The characteristics of the laminate were as shown in Table 6.

EXAMPLE 23

A mixture of 150 g of cresol, 127 g of formaline (37% aqueous solution) and 2.6 g of aqueous ammonia (28%) was subjected to reaction under reflux, then to dehydration, and thereafter, 99 g of diphenyl hydroxymethyl phosphonate and acetone were added to the thus dehydrated reaction product to obtain a uniform solution. Using this resin solution, a laminate was prepared in the same manner as in Example 20. The characteristics of the laminate were as shown in Table 6.

Comparative Example 6

A mixture of 150 g of cresol, 127 g of formaline (37% aqueous solution) and 2.6 g of ammonia (28% aqueous solution) was subjected to reaction under reflux for 1.5 hrs., then to dehydration and thereafter diluted with acetone. To the resulting resin solution was added 99 g of tricresyl phosphate, and a sheet of linter paper was impregnated with the resulting mixture. A laminate was prepared from the thus impregnated paper in the same manner as in Example 20. The characteristics of the laminate were as shown in Table 6.

Table 6

| Example No. | | 22 | 23 | Comp. Ex. 6 |
|---|---|---|---|---|
| Flame resistance (JIS method) | Time (sec.) | 3 | 2 | 7 |
| | Distance (mm) | 10 | 9 | 14 |
| Trichloroethylene resistance (Boiled for 5 min.) | | No change | No change | Surface-whitened, and swollen |
| Solder heat resistance (260° C) (sec.) | | >60 | >30 | 12 |
| Flexural strength (transverse) (kg/mm²) | A | 12.9 | 13.0 | 8.4 |
| Insulation resistance (Ω) | C-90/20/65 | 8×10¹¹ | 8×10¹¹ | 1.5×10¹¹ |
| | D-2/100 | 3×10⁸ | 4×10⁸ | 2×10⁷ |
| Dielectric loss tangent (1 MHz) (× 10⁻⁴) | C-90/20/65 | 341 | 367 | 385 |
| | D-48/50 | 548 | 598 | 921 |

Note:
A: be received
C-90/20/65: Treatment at 20° C, 65% RH for 90 hrs.
D-48/50: Immersion in water at 50° C for 48 hrs.
D-2/100: Immersion in water at 100° C for 2 hrs.

As is clear from Table 6, laminates having good flame resistance were obtained while maintaining the characteristics of phenol resin.

EXAMPLE 24

A uniform mixture of 154 g of di(2,3-dichloropropoxy)hydroxymethyl phosphonate, 45 g of a bisphenol-A-based epoxy resin which has a number average molecular weight of 380 and an epoxy equivalent of 190 and 0.5 g of sulfuric acid was subjected to reaction at 90° C for 2.0 hrs. The reaction product was neutralized with a dimethylamine and then blended with 255 g (as solids) of a resol type phenol resin obtained under conventional reaction conditions. The resulting mixture was diluted with acetone to obtain a phenolic resin solution. A sheet of craft paper having a thickness of 0.25 mm was impregnated with the resulting mixture, and then dried to the B-stage. The weight ratio of the resin adhered to the paper to the base material was 0.9 : 1. Nine sheets of the thus impregnated paper were one on another, and a copper foil was placed on one side of the resulting assembly. The resulting assembly was heated and the compressed for 40 min. under conventional conditions, and then cooled. The characteristics of the thus obtained laminate were as follows:

Flame resistance (JIS C-6481)
Time 3 sec.
Distance 9 mm
Solder heat resistance (260° C)
>60 sec.

What is claimed is:

1. A flame resistant thermosetting resin molding, laminating electrical insulatory or adhesive composition comprising a reaction product of a thermosetting resin selected from the group consisting of phenolic resins, epoxy resins, these resins modified with one another, and these resins modified with amino resins at and least one compound selected from the group consisting of phosphorus compounds represented by the general formula,

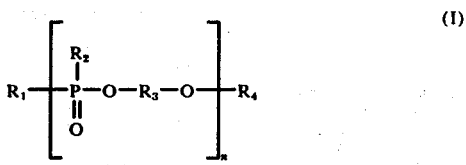

wherein $R_1$ and $R_2$, which may be the same or different, represent each an alkyl, aryl, alkoxy, or aryloxy group, which has up to 10 carbon atoms and may have one or more hydroxyl substituents; $R_3$ represents an aromatic ring; $R_4$ represents a hydrogen atom or an alkyl or aryl group, both groups having up to 10 carbon atoms; and $n$ is an integer from 2 to 30, phosphorus compounds represented by the general formula,

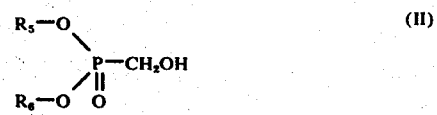

wherein $R_5$ and $R_6$, which may be the same or different, represent each an alkyl, alkenyl, or aryl group, which has up to 20 carbon atoms and may have one or more halogen atoms, and phosphorus compounds represented by the general formula,

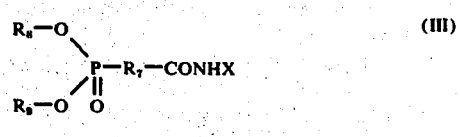

wherein $R_8$ and $R_9$, which may be the same or different, represent each an alkyl, alkenyl or aryl group, which has up to 20 carbon atoms and may have one or more halogen substituents, $R_7$ represents an alkylene, alkenylene or arylene group, which has up to 10 carbon atoms and may have one or more halogen substituents and X represents a hydrogen atom or hydroxymethyl group, the ratio of the phosphorus compound to the thermosetting resin being in the range of 0.7 to 6% by weight in terms of phosphorus atom content of the total resin.

2. A composition according to claim 1, wherein a phenol and formaldehyde are reacted in the presence of a compound represented by the formula (I).

3. A composition according to claim 1, wherein a phenol-formaldehyde-type resin is admixed with a compound represented by the formula (I).

4. A composition according to claim 1, wherein an epoxy resin is admixed with a compound represented by the formula (I).

5. A composition according to claim 1, wherein a phenolic resin modified with an amino resin is admixed with a compound represented by the formula (I).

6. A composition according to claim 5, wherein the amino resin is a melamine resin.

7. A composition according to claim 5, wherein the amino resin is a guanamine resin.

8. A composition according to claim 1, wherein a phenolic resin modified with an epoxy resin is admixed with a compound represented by the formula (I).

9. A composition according to claim 1, wherein a phenol and formaldehyde are reacted in the presence of a compound represented by the formula (II).

10. A composition according to claim 9, wherein $R_5$ and $R_6$ of the formula (II) are each an alkyl group or an aryl group, both groups having up to 20 carbon atoms.

11. A composition according to claim 1, wherein an epoxy resin is admixed with a compound represented by the formula (II).

12. A composition according to claim 1, wherein a melamine resin is admixed with a compound represented by the formula (II).

13. A composition according to claim 1, wherein a phenol and formaldehyde are reacted in the presence of the compound represented by the formula (III).

14. A composition according to claim 13, wherein $R_8$ and $R_9$ of the formula (III) are each an alkyl, alkenyl, or aryl group, these groups have up to 20 carbon atoms.

15. A composition according to claim 1, wherein a phenol-formaldehyde-type resin is admixed with a compound represented by the formula (III).

16. A composition according to claim 1, wherein an epoxy resin is admixed with a compound represented by the formula (III).

17. A composition according to claim 1, wherein a melamine resin or a guanamine resin is admixed with a compound represented by the formula (III).

18. A composition according to claim 1, wherein the compound of formula (II) is reacted with an epoxy compound having at least one epoxy group in the molecule and the reaction product is then blended with the thermosetting resin.

19. A method for manufacturing a flame resistant thermosetting resin composition for molding, laminating, electrical insulating and adhesives, which is characterized by mixing a thermosetting resin selected from the group consisting of phenolic resins, epoxy resins, these resins modified with one another and these resins modified with amino resins, or the reactants used to form such a thermoplastic resins and effecting the reacting thereof, with at least one compound selected from the group consisting of phosphorus compounds represented by the general formula,

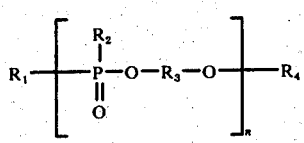

wherein $R_1$ and $R_2$, which may be the same or different, represent each an alkyl, aryl, alkoxy or aryloxy group, which has up to 10 carbon atoms and may have one or more hydroxyl substituents; $R_3$ represents an aromatic ring; $R_4$ represents a hydrogen atom or an alkyl or aryl group, both groups having up to 10 carbon atoms; and $n$ is an integer from 2 to 30, phosphorus compounds represented by the general formula,

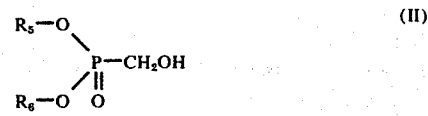

wherein $R_5$ and $R_6$, which may be the same or different, represent each an alkyl, alkenyl, or aryl group, which has up to 20 carbon atoms and may have one or more halogen atoms, and phosphorus compounds represented by the general formula,

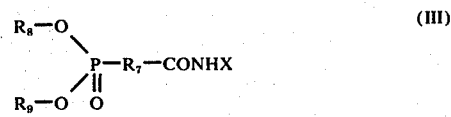

wherein $R_8$ and $R_9$, which may be the same or different, represent each an alkyl, alkenyl or aryl group, which has up to 20 carbon atoms and may have one or more halogen substituents, $R_7$ represents an alkylene, alkenylene or arylene group, which has up to 10 carbon atoms and may have one or more halogen substituents and X represents a hydrogen atom or hydroxymethyl group, the ratio of the phosphorus compound to the thermosetting resin being in the range of 0.7 to 6% by weight in terms of phosphorus atom content of the total resin.

20. A method according to claim 19, wherein a phenol and formaldehyde are reacted in the presence of a compound represented by the formula (I).

21. A method according to claim 19, wherein a phenol-formaldehyde-type resin is admixed with a compound represented by the formula (I).

22. A method according to claim 19, wherein an epoxy resin is admixed with a compound represented by the formula (I).

23. A method according to claim 19, wherein a phenolic resin modified with an amino resin is admixed with a compound represented by the formula (I).

24. A method according to claim 23, wherein the amino resin is a melamine resin.

25. A method according to claim 23, wherein the amino resin is a guanamine resin.

26. A method according to claim 19, wherein a phenolic resin modified with an epoxy resin is admixed with a compound represented by the formula (I).

27. A method according to claim 19, wherein a phenol and formaldehyde are reacted in the presence of a compound represented by the formula (II).

28. A method according to claim 19, wherein an epoxy resin is admixed with a compound represented by the formula (II).

29. A method according to claim 19, wherein a melamine resin is admixed with a compound represented by the formula (II).

30. A method according to claim 19, wherein a phenol and formaldehyde are reacted in the presence of a compound represented by the formula (III).

31. A method according to claim 19, wherein a phenol-formaldehyde-type resin is admixed with a compound represented by the formula (III).

32. A method according to claim 19, wherein an epoxy resin is admixed with a compound represented by the formula (III).

33. A method according to claim 19, wherein a phenolic resin modified with a melamine resin or a phenolic resin modified with a guanamine resin is admixed with a compound represented by the formula (III).

* * * * *